(12) United States Patent
Yalamarthi et al.

(10) Patent No.: US 11,281,412 B2
(45) Date of Patent: Mar. 22, 2022

(54) DOCUMENT OPERATION PERFORMANCE

(71) Applicant: Hewlett-Packard Development Company, L.P., Spring, TX (US)

(72) Inventors: Balaji Yalamarthi, Bangalore (IN); Shakti Amarendra, Bangalore (IN); Anusha Ghali, Bangalore (IN); Vasu Agrawal, Bangalore (IN); Sharanabasappa, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,960

(22) PCT Filed: Apr. 9, 2019

(86) PCT No.: PCT/US2019/026442
§ 371 (c)(1),
(2) Date: Oct. 15, 2020

(87) PCT Pub. No.: WO2020/005360
PCT Pub. Date: Jan. 2, 2020

(65) Prior Publication Data
US 2021/0165615 A1 Jun. 3, 2021

(51) Int. Cl.
*G06F 3/12* (2006.01)
*H04N 1/00* (2006.01)

(52) U.S. Cl.
CPC .......... *G06F 3/1238* (2013.01); *G06F 3/1203* (2013.01); *G06F 3/129* (2013.01); *G06F 3/1271* (2013.01); *G06F 3/1284* (2013.01); *H04N 1/00384* (2013.01); *H04N 1/00477* (2013.01); *H04N 1/00954* (2013.01); *H04N 1/00973* (2013.01); *H04N 2201/0094* (2013.01)

(58) Field of Classification Search
CPC .... G06F 3/1238; G06F 3/1203; G06F 3/1271; G06F 3/1284; G06F 3/129; H04N 1/00384; H04N 1/00477; H04N 1/00954; H04N 1/00973
USPC ....................................................... 358/1.15
See application file for complete search history.

(56) References Cited

U.S. PATENT DOCUMENTS

| | | | |
|---|---|---|---|
| 6,421,135 B1 | 7/2002 | Fresk | |
| 7,701,616 B2 | 4/2010 | Gogulapati | |
| 8,717,593 B2 | 5/2014 | Kakegawa | |
| 8,879,074 B2 | 11/2014 | Nash | |
| 9,223,529 B1* | 12/2015 | Khafizova | G06F 3/1285 |
| 9,324,014 B1* | 4/2016 | Dixon | G06F 3/1242 |
| 9,639,669 B2 | 5/2017 | Pathak | |
| 2008/0144127 A1 | 6/2008 | Tian | |
| 2009/0190161 A1* | 7/2009 | Goh | G06F 3/1238 |
| | | | 358/1.15 |
| 2009/0207441 A1* | 8/2009 | Kotaka | H04N 1/32 |
| | | | 358/1.15 |
| 2013/0063759 A1 | 3/2013 | Kutoh | |
| 2013/0192482 A1* | 8/2013 | Bloom | H05K 3/1241 |
| | | | 101/127 |

(Continued)

*Primary Examiner* — Allen H Nguyen
(74) *Attorney, Agent, or Firm* — Mannava & Kang, P.C.

(57) ABSTRACT

Examples disclosed herein relate to receiving a first request to begin a first operation on a physical document, receiving a second request to begin a second operation, determining whether the first operation has completed, and in response to determining that the first operation has not completed, delay performance of the second operation.

15 Claims, 3 Drawing Sheets

(56) References Cited

U.S. PATENT DOCUMENTS

2015/0341511 A1 11/2015 Kodimer
2018/0144146 A1* 5/2018 Juriasingani .......... H04L 9/0894
2018/0307450 A1* 10/2018 Pandi .................... G06F 3/1241

* cited by examiner

DOCUMENT OPERATION PERFORMANCE

BACKGROUND

Multi-function devices often combine different components such as a printer, scanner, and copier into a single device. Such devices frequently enable network access to their functions, such as scanning documents to a file that may then be retrieved from other network-connected devices, such as smartphones and computers.

Figure 1:
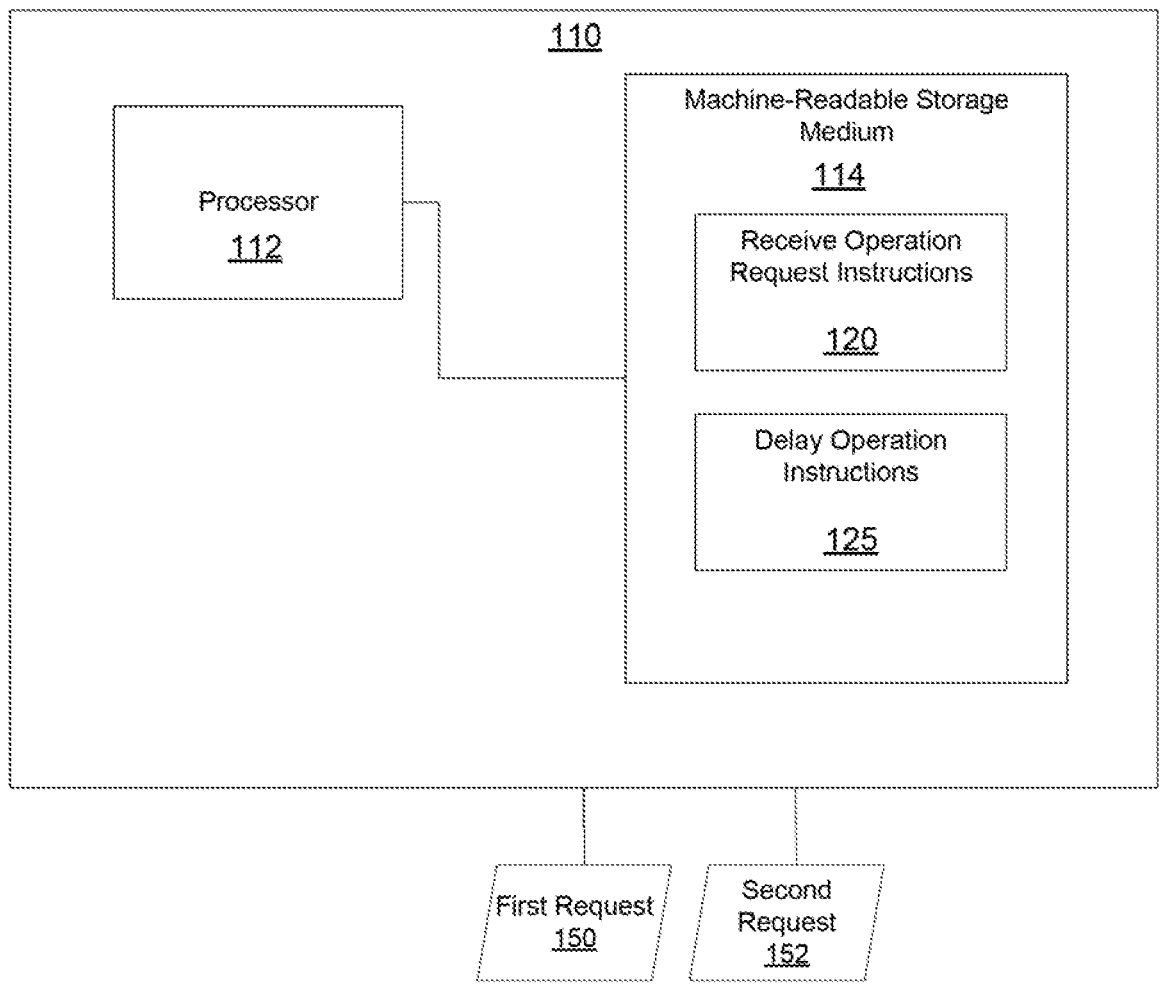
FIG. 1 is a block diagram of an example computing device for providing document operation performance.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

The optical assembly may capture an image of the document for storage in a digital file format. For example, the optical assembly may comprise a light source and an image sensor. The image sensor may be a linear image sensor or an array of image sensors that spans a width of a document to be scanned. The light source may be a linear light source, such as a florescent tube, an array of light sources, such as a series of light emitting diodes (LEDs), or a light guide with a point light source or sources. The light source may emit light through the scan window onto the medium to be scanned while the image sensor captures light reflected by the medium through the scan window. A lens or array of lenses, such as a rod lens array, may be provided to focus light on the image sensor. In some implementations, the physical document may comprise a source object other than paper. For example, some scanning systems may capture a digital representation of a physical and/or 3D object that may be used for producing a 3D printing model.

Once captured, the image of the document may be stored in a digital file format such as a portable document format (PDF), a tagged image file format (TIFF). JPEG, etc. Such files may be stored on the MFP and/or in another storage device, such as a network-attached storage, external drive, cloud service, etc. The file may be accessed in numerous ways, such as entailing to a user and/or retrieved by following a web-based link to the file's storage location.

With scanning and the digitizing documents becoming a common practice, there is an increasing importance to safeguard the privacy of the documents being scanned. The introduction of multiple scan methods, such as walkup and remote scan operations, has opened new vulnerability scenarios for a document placed on the scan bed. When a walkup user scans/copies a confidential document using an MFP's control panel, such as by putting the document on the MFP's scan bed, authorized apps such as mobile apps, web scan applications, or scan software may be able to remotely execute scan jobs in parallel too and create unknown and/or unauthorized digital copies of data not intended for them.

Web-based scanning is one way to get a physical document on a scanner (MFP) scanned remotely from another computing device. For example, an application with access to the MFP may be controlled via a web page from various locations and devices. In some implementations, these remote devices may poll the MFP's scan bed, such as on a periodic, continuous, and/or on-demand basis, and may be able to access the confidential documents of other users. When a user, physically present at an MFP, puts a document on the scan bed or into a document feeder, there may be a window of opportunity for web scan devices to execute a remote scan and to pull the confidential data.

In some implementations, an MFP may block remote operations on a physical document on a scan bed and/or document feeder. For example, web-based scanning may be disabled until a job initiated by a walkup user is completed. The MFP may, in some implementations, track requests for remote access to the document. These requests may be presented to the walkup user for confirmation and/or matched with the walkup user's authentication details to validate the request. For example, if a user authenticates with the MFP when placing the physical document into the device, then a remote scan from that user's computer, which may be associated with the same authentication credentials, may be permitted. In some implementations, a PIN and/or other authorization code may be generated by the MFP and/or created by the user when the documents are loaded into the device, and only remote services able to provide the PIN may be authorized to perform a scan and/or copy operation and/or receive the resulting digital file from such an operation associated with the document. The term PIN here may indicate alphanumeric data and/or other authentication mechanisms such as applications, smartcards, biometrics, etc.

FIG. 1 is a block diagram of an example computing device 110 for providing document operation performance. Computing device 110 may comprise a processor 112 and a non-transitory, machine-readable storage medium 114. Storage medium 114 may comprise a plurality of processor-executable instructions, such as receive operation request instructions 120 and delay operation instructions 125. In some implementations, instructions 120, 125 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125.

Executable instructions 120, 125 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive operation instructions 120 may receive a first request 150 to begin a first operation on a physical document and receive a second request 152 to begin a second operation. In some implementations, first request 150 and second request 152 may comprise scan, copy and/or fax operation. Requests 150, 152 may be received, for example, from a control panel interface coupled to device 110 and/or may be received from a remote interface, such as a computer-based application (e.g., a driver application and/or scanning software), a mobile application (e.g., a smartphone app), a network application (e.g., a web-based application), and/or another operational request interface executing on a device other than device 110.

For example, first request 150 may comprise a request to begin a scan and/or copy operation at device 110 comprising a multi-function print device. The request may comprise, for example, a control panel selection of the operation and/or the request may comprise an automatic trigger upon detection of a physical document being placed in a document feeder and/or other document location, such as a flatbed of a scanner tray.

In some implementations, first request 150 and second request 152 may be associated with different users. For example, first request 150 may be received from a user physically proximate to device 110 who is interacting with device 110, such as via the control panel. Second request 152 may be received from a user remote to device 110, such as a user interacting with device 110 over a network.

Delay operation instructions 125 may determine whether the first operation has completed and, in response to determining that the first operation has not completed, delay and/or refuse performance of the second operation. In some implementations, delay operation instructions 125 may, in response to determining that the first operation has not completed, allow the second operation to proceed. In some implementations, delay operation instructions 125 may delay performance of the second operation, until the physical document has been removed and/or until an authorization to perform the second operation is received from a user associated with the first request. In some implementations, delay/refuse operation instructions 125 may refuse performance of the second operation when denial of authorization to perform the second operation is received from a user associated with the first request.

For example, first request 150 to perform a copy operation on a physical document may be received via the control panel of device 110. While the copy operation is in process, a second request 152 may be received from a remote user, such as from a web-based application, to create a digital scan and/or copy of the same physical document for delivery to the remote user. In some implementations, delay operation instructions 125 may automatically deny the second request 152 to prevent an unauthorized user from obtaining a copy of the document. In other implementations, delay operation instructions 125 may notify the first user associated with the first request 150 of the second request 152 and ask the first user to approve or disapprove the request. The user may provide their approval or disapproval, for example, via the control panel and/or other interface to device 110 (e.g., email, mobile app, voice command, etc.).

Figure 2:
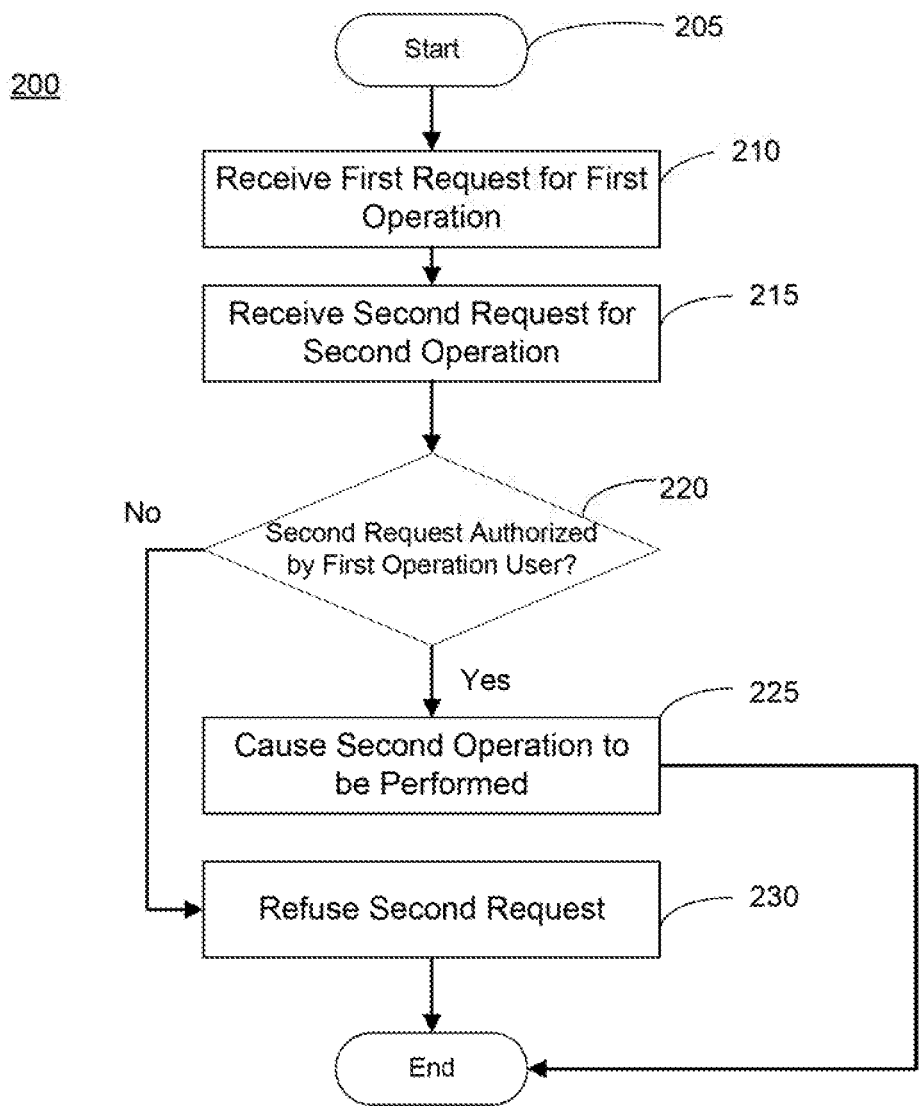
FIG. 2 is a block diagram of an example system for providing document operation performance.

FIG. 2 is a flowchart of an example method 200 for document operation performance. Although execution of method 200 is described below with reference to computing device 110, other suitable components for execution of method 200 may be used.

Method 200 may begin at stage 205 and advance to stage 210 where device 110 may receive a first request to begin a first operation on a physical document.

Method 200 may then advance'to stage 215 where computing device 110 may receive a second request to begin a second operation on the physical document. In some implementations, the second request may be received from a remote device.

For example, receive operation instructions 120 may receive a first request 150 to begin a first operation on a physical document and receive a second request 152 to begin a second operation. In some implementations, first request 150 and second request 152 may comprise scan and/or copy operation. Requests 150, 152 may be received, for example, from a control panel interface coupled to device 110 and/or may be received from a remote interface, such as a computer-based application (e.g., a driver application and/or scanning software), a mobile application (e.g., a smartphone app), a network application (e.g., a web-based application), and/or another operational request interface executing on a device other than device 110.

For example, first request 150 may comprise a request to begin a scan and/or copy operation at device 110 comprising a multi-function print device. The request may comprise, for example, a control panel selection of the operation and/or the request may comprise an automatic trigger upon detection of a physical document being placed in a document feeder and/or other document location, such as a flatbed of a scanner tray.

Method 200 may then advance to stage 220 where computing device 110 may determine whether the second request is authorized by a user associated with the first operation. In some implementations, the first request and second request may be associated with different users. In instances that both requests are from the same user, device 110 may determine that the second request is automatically approved.

For example, delay operation instructions 125 may determine whether the first operation has completed and, in response to determining that the first operation has not completed, delay performance of the second operation. In some implementations, delay operation instructions 125 may, in response to determining that the first operation has not completed, allow the second operation to proceed. In some implementations, delay operation instructions 125 may delay performance of the second operation until the physical document has been removed and/or until an authorization to perform the second operation is received from a user associated with the first request.

For example, first request 150 to perform a copy operation on a physical document may be received via the control panel of device 110. While the copy operation is in process, a second request 152 may be received from a remote user, such as from a web-based application, to create a digital scan and/or copy of the same physical document for delivery to the remote user. In some implementations, delay operation instructions 125 may automatically deny the second request 152 to prevent an unauthorized user from obtaining a copy of the document. In other implementations, delay operation instructions 125 may notify the first user associated with the first request 150 of the second request 152 and ask the first user to approve or disapprove the request. The user may provide their approval or disapproval, for example, via the control panel and/or other interface to device 110 (e.g., email, mobile app, voice command, etc.).

In response to determining that the second request is authorized, method 200 may advance to stage 225, where device 110 may cause the second operation to be performed. For example, device 110 may perform digitization of the physical document as part of performing a scan/copy operation and may use that digitization to complete the operations associated with both the first request and the second request.

In response to determining that the second request is not authorized, method 200 may advance to stage 230, where device 110 may refuse the second request. For example, device 110 may simply ignore the second request and/or may provide a notification and/or error message to the user and/or application associated with making the second request.

Method 200 may then end at stage 250.

Figure 3:
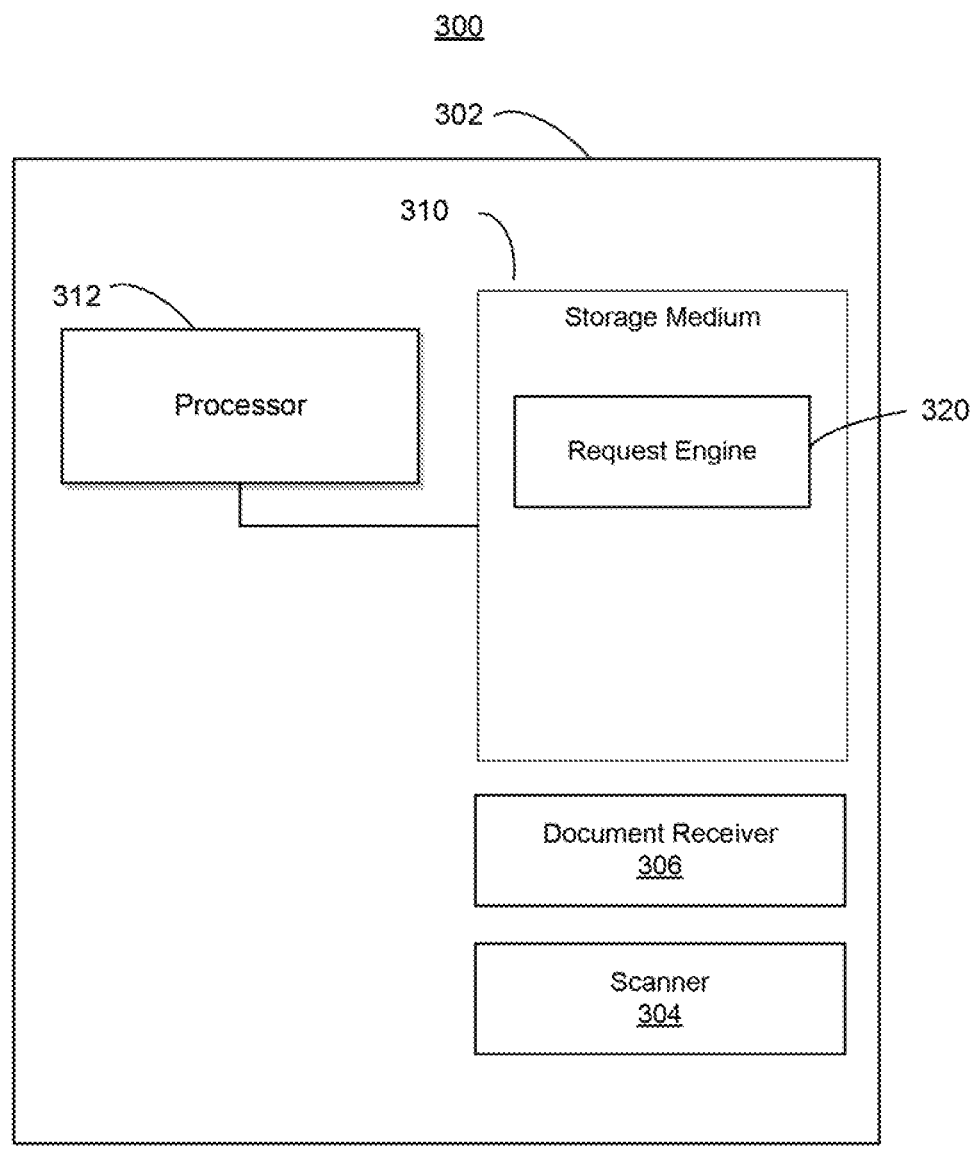
FIG. 3 is a flowchart of an example method for providing document operation performance.

FIG. 3 is a block diagram of an example apparatus 300 for providing document operation performance. Apparatus 300 may comprise a multi-function printer device 302 comprising a scanner 304, a document receiver 306, a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a request engine 320.

Engine 320 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engine 320. In such examples, device 302 may comprise the machine-readable storage medium storing the instructions and the processing resource to execute the instructions, or the machine-readable storage medium may be separate but accessible to apparatus 300 and the processing resource.

Scanner 304 may receive a physical document and capture an image file associated with the physical document. For example, device 302 may comprise a scanner component operable to capture a digital representation of a physical document. Such a scanner component may comprise a camera and/or a sheet-fed, flat-bed, and/or drum scanner. The scanner may, for example use a charge-coupled device (CCD), a photomultiplier tube (PMT), and/or a contact image sensor (CIS) as an image sensor.

Document receiver 306 may receive a physical document. For example, document receiver 304 may comprise an automatic document feeder (ADF), sheet feeder, input tray, and/or flatbed scanner surface. Sensors associated with device 302 may detect the presence of a physical document in document receiver 306, such as by optical detection, mechanical switch, etc.

Request engine 320 may receive a first request for a first operation on the physical document from a first user via a control panel coupled to the apparatus, receive a second request for a second operation on the physical document from a remote user, and determine if the second request is authorized by the first user.

Scanner 304 may perform the first operation on the physical document and in response to determining that the second request is authorized, perform the second operation.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine readable storage medium having stored thereon machine-readable instructions executable to cause a processor of a multi-function-print (MFP) device to:
   receive a first request to begin a first operation on a physical document, wherein the physical document is placed in the MFP device;
   subsequent to receiving the first request and while the physical document is still placed in the MFP device, receive a second request to begin a second operation on the physical document associated with the first operation;
   determine whether the second operation is authorized by a user associated with the first operation; and
   in response to determining that the second request is authorized by the user associated with the first operation, cause the second operation to be performed.

2. The non-transitory machine-readable storage medium of claim 1, wherein the first operation comprises a scan operation.

3. The non-transitory machine-readable storage medium of claim 1, wherein the first operation comprises a copy operation.

4. The non-transitory machine-readable storage medium of claim 1 wherein the first request is received from a control panel interface of the MFP device.

5. The non-transitory machine-readable storage medium of claim 1, wherein the second request is received from a remote interface.

6. The non-transitory machine-readable storage medium of claim 5, wherein the remote interface comprises at least one of the following: a computer-based software application, a network application, and a mobile application.

7. The non-transitory machine-readable storage medium of claim 1, wherein the first request and the second request are associated with different users.

8. The non-transitory machine-readable storage medium of claim 1, wherein, in response to determining that the second operation is not authorized by the user associated with the first operation, a performance of the second operation is delayed until the physical document has been removed.

9. The non-transitory machine-readable storage medium of claim 1, wherein the machine-readable instructions further cause the processor to:
in response to determining that the second request is not authorized by the user associated with the first operation, refuse the second request.

10. A method comprising:
receiving, by a processor of a multi-function-print device, a first request to begin a first operation on a physical document, wherein the physical document is placed in the MFP device;
subsequent to receiving the first request and while the physical document is still placed in the MFP device, receiving, by the processor, a second request to begin a second operation on the physical document associated with the first operation;
determining, by the processor, whether the second request is authorized by a user associated with the first operation; and
in response to determining that the second request is authorized by the user associated with the first operation, causing, by the processor, the second operation to be performed.

11. The method of claim 10, wherein determining that the second request is authorized by the user comprises requesting authorization via a user interface displayed on a control panel of the MFP device configured to perform the first operation on the physical document.

12. The method of claim 11, wherein the second request is received from a remote device.

13. The method of claim 10, further comprising, in response to determining that the second request is not authorized, refusing the second request.

14. The method of claim 10, wherein the first request and the second request are associated with different users.

15. An apparatus, comprising:
a document receiver to:
receive a physical document;
a request engine to:
receive a first request for a first operation on the physical document from a first user via a control panel coupled to the apparatus,
subsequent to receiving the first request and while the physical document is still in the document receiver, receive a second request for a second operation on the physical document from a remote user, and
determine if the second request is authorized by the first user associated with the first operation; and
a scanner to:
perform the first operation on the physical document, and
in response to determining that the second request is authorized the first user associated with the first operation, perform the second operation.

* * * * *